United States Patent

[11] 3,627,750

| [72] | Inventor | Karl Ronco |
| | | Riehen, Switzerland |
| [21] | Appl. No. | 786,751 |
| [22] | Filed | Dec. 24, 1968 |
| [45] | Patented | Dec. 14, 1971 |
| [73] | Assignee | Ciba Limited |
| | | Basel, Switzerland |
| [32] | Priority | Jan. 10, 1968 |
| [33] | | Switzerland |
| [31] | | 332/68 |

[54] AZO PIGMENTS
2 Claims, No Drawings

[52] U.S. Cl. ............................................... 260/174,
106/23, 106/288 Q, 117/138.8 R, 117/138.8 D,
117/138.8 F, 117/138.8 UA, 117/139, 117/144,
260/176, 260/178, 260/203, 260/204, 260/544 M

[51] Int. Cl. ............................................... C09b 29/26,
D06p 1/08

[50] Field of Search ............................................... 260/178,
203, 204, 174

[56] References Cited
UNITED STATES PATENTS

| 1,947,550 | 2/1934 | Hitch | 260/204 X |
| 2,888,453 | 5/1959 | Schmid et al. | 260/174 |
| 3,113,938 | 12/1963 | Nakaten et al. | 260/204 |
| 3,137,688 | 6/1964 | Ronco | 260/174 |
| 3,366,623 | 1/1968 | Ronco | 260/203 |
| 3,394,124 | 7/1968 | Ronco et al. | 260/204 |
| 3,402,168 | 9/1968 | Ronco et al. | 260/204 |
| 3,472,834 | 10/1969 | Ronco et al. | 260/203 |

*Primary Examiner*—Floyd D. Higel
*Attorneys*—Harry Goldsmith, Joseph G. Kolodny, Bryant W. Brennan and Edward J. Sites

ABSTRACT: Azo dyestuffs of the formula $$R_1-N=N-R_2-CONHR_3$$

in which $R_1$ and $R_3$ each represents an aromatic radical and $R_2$ represents a hydroxynaphthalene radical in which the azo, hydroxyl and carboxylic acid amide groups are in the 1,2,3-position or $R_2$ represents the radical of an enolised or enolisable ketomethylene compound, and in which one of the radicals $R_1$ or $R_3$ possesses a group of formula $-NHCO-CONHR_4$ in which $R_4$ represents a hydrogen atom an alkyl or aryl radical or an azo dyestuff radical are valuable pigments which color rayon and viscose or cellulose ethers and esters in yellow to red shades of excellent fastness to migration.

AZO PIGMENTS

The present invention provides valuable water-insoluble azo dyestuff pigments of formula (1)  $R_1-N=N-R_2-CONHR_3$ wherein $R_1$ and $R_3$ each represents an aromatic or heterocyclic residue and $R_2$ represents a hydroxynaphthalene residue in which the azo, hydroxyl and carboxylic acid amide group are in the 1,2,3-position or $R_2$ represents the residue of an enolised or enolisable ketomethylene compound, and wherein one of the residues $R_1$ and $R_3$ possesses a group of formula $-NH-CO-CO-NH-R_4$ wherein $R_4$ represents a hydrogen atom, an alkyl or aryl residue or an azo dyestuff residue which is free of acid groups which confer solubility in water, for example a residue of formula $-R_5NHCOR_2-N=N-R_6$ or $-R_7-N=N-R_2-CONHR_8$, wherein $R_2$ has the meaning given above and $R_5$, $R_6$, $R_7$ or $R_8$ each represents an aromatic or heterocyclic residues.

The present invention also provides a process for preparing the compounds of the above formula I which comprises, a) condensing a carboxylic acid halide of formula $R_1-N=N-R_2-COHal$ with an amine of formula $R_3NH_2$ or b) coupling a diazo or diazoamino compound of an amino of formula $R_1NH_2$ with an azo component of formula $R_2CONH-R_3$ with the components being so chosen that one of the residues $R_1$ or $R_3$ possesses a group of formula $-NHCOCONHR_4$.

Since the dyestuffs according to the invention are pigments, groups which confer solubility in water, especially acid groups which confer solubility in water, for example, sulfonic acid or carboxylic acid groups, are of course excluded.

Dyestuffs of especial interest are those of the formula (2) 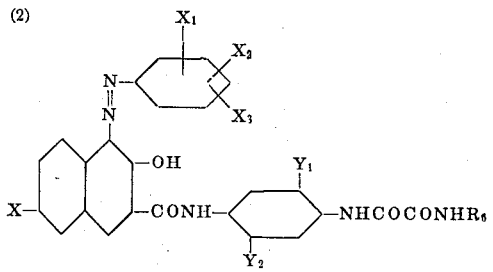

or (2a) 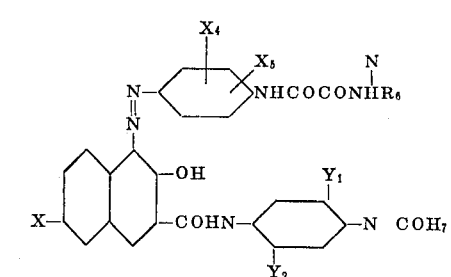

in which X represents a hydrogen or halogen atom or an alkoxy group, $X_1$ and $X_2$ each represents a hydrogen or halogen atom or an alkyl, alkoxy, phenoxy, nitro, nitrile, carboxylic acid ester, aliphatic acylamino or trifluoromethyl group, $X_3$ represents a hydrogen or halogen atom or a group of formula $-CONHR_5$, in which $R_5$ represents a hydrogen atom an alkyl residue or a phenyl residue which is optically substituted, for example by a halogen atom, alkyl, trifluoromethyl, alkoxy, nitro, cyano, carbalkoxy or alkanoylamino group, $X_4$ represents a hydrogen or halogen atom or an alkyl, alkoxy, carboxylic acid ester or phenoxy group, $X_5$ represents a hydrogen or halogen atom, $Y_1$ and $Y_2$ each represents a hydrogen or halogen atom, alkyl or alkoxy groups, $R_6$ represents a hydrogen atom, an alkyl group or a phenyl residue which is optionally substituted, for example by a halogen atom, or an alkyl, alkoxy, nitro, carbalkoxy or aliphatic acylamino group, and $R_7$ represents a hydrogen atom, an alkyl, aryl, amino, alkylamino or arylamino group, or a heterocyclic residue.

Further dyestuffs of interest are those which contain enolisable ketomethylene groups which are, for example, derived from an acetoacetic acid arylide or a pyrazolone.

As examples there may be mentioned:

(3) 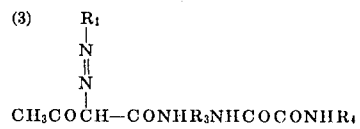

or (4) 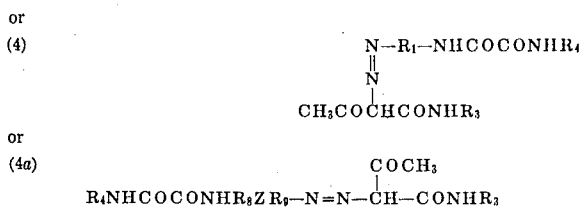

or (4a) 
$R_4NHCOCONHR_8ZR_9-N=N-CH-CONHR_3$ with $COCH_3$ in which $R_1$, $R_3$ and $R_4$ have the meanings given above, $R_8$ and $R_9$ each represents a benzene residue and Z represents a carboxylic acid amide group.

The following groups may be mentioned from the series of the disazo dyestuffs:

(5) 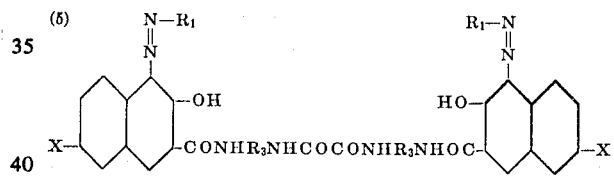

or (6) 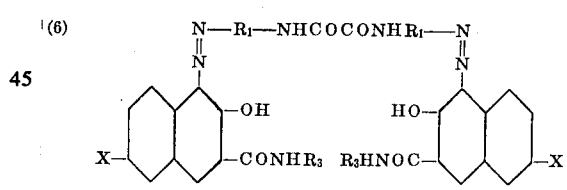

or (7) 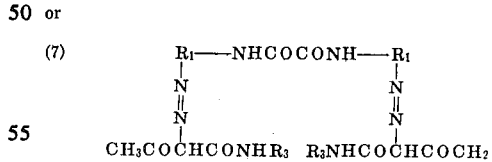

or (8) 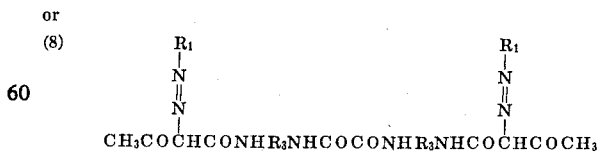

The disazo dyestuffs of formula (5) may be further described as follows.

A disazo pigment of the formula

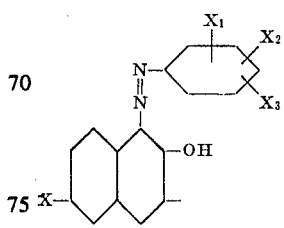

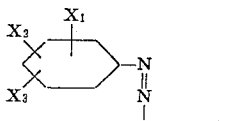

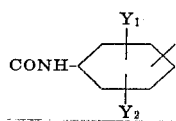 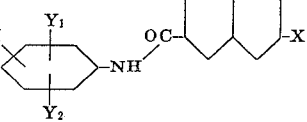

in which X represents hydrogen, halogen or lower alkoxy, $X_1$ represents hydrogen, halogen, lower alkyl, lower alkoxy, phenoxy, nitro, cyano, lower carbalkoxy, carbophenoxy, lower alkanoylamino or trifluoromethyl, $X_2$ stands for hydrogen, halogen, lower alkyl, lower alkoxy or trifluoromethyl, $X_3$ represents hydrogen, halogen or a group of formula —CONHR$_5$, in which R$_5$ represents hydrogen, lower alkyl or phenyl radical which may be substituted by halogen, lower alkyl, alkoxy, or carbalkoxy, nitro or trifluoromethyl, $Y_1$ and $Y_2$ each represents hydrogen, halogen or lower alkyl or alkoxy.

The dyestuffs of formula (2) or (2a) are obtained if a carboxylic acid chloride of formula (9)

(9a)

in which X, $X_1$, $X_2$, $X_3$, $X_4$, $X_5$ and $R_6$ have the moaning given above is condensed with an amine of formula (10)

or
(10a)

wherein $Y_1$, $Y_2$, $R_6$ and $R_7$ have the meanings given above.

The carboxylic acids on which the chlorides of formulas (9) and (9a) are based may be obtained by coupling the diazo compound of an aminobenzene of formula (11)

or
(11a)

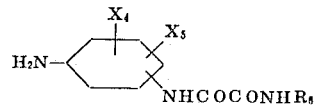

with a 2,3-hydroxynaphthoic acid of formula

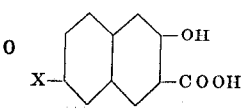

The following may be mentioned as examples of aminobenzenes of formula (11): 2-, 3-, or 4-chloraniline, 3,4-dichloraniline, 2,3-dichloraniline, 2,4-dichloraniline, 2,5-dichloraniline, 2,6-dichloraniline, 2,4,5-trichloraniline, 2,4,6-trichloraniline, 2-, 3- or 4-bromaniline, 2,4-dibromaniline, 2,5-dibromaniline, 2-methyl-5-chloraniline, 2-methyl-4-chloraniline, 2-methyl-3-chloraniline, 2-chloro-5-trifluoromethylaniline, 2-, 3-, 4-nitroaniline, 4-chloro-2-nitroaniline, 2-chloro-4-nitroaniline, 4-methyl-3-nitroaniline, 2,4-dimethyl-3-nitroaniline, 2-methyl-5-nitroaniline, 2-methyl-4-nitroaniline, 2- and -methoxyaniline, 3-chloro-4-methoxyaniline,2-methoxy-5-nitroaniline, 2-methoxy-5-chloraniline, 2-methoxy-5-trifluoromethylaniline, 2-amino-4-trifluoromethyl-4'-chlorodiphenyl ether, 2-nitro-4-ethoxyaniline, 2-amino-4-chlorodiphenyl ether, 2-amino-2'4-dichlorodiphenyl ether, 2-amino-4,4'-dichloro-diphenyl ether, 1-aminobenzene-2-carboxylic acid methyl ester, 1-aminobenzene-2-carboxylic acid ethyl ester, 1-aminobenzene-2-chloro-5-carboxylic acid methyl ester, 2-amino-5-nitrobenzoic acid methyl ester, 4-amino-3-nitrobenzotrifluoride, 2-amino-5-nitrobenzotrifluoride, 1-amino-2-methylbenzene-5-carboxylic acid methyl ester, 1-amino-2-chlorobenzene-5-carboxylic acid methylamide, 2-amino-4-trifluoromethyl-diphenyl ether, 4-methyl-3-aminobenzoic acid amide, 4-chlor-3-aminobenzoic acid amide, 2,4-dichlor-5-aminobenzoic acid amide, 4-methoxy-3-aminobenzoic acid amide, 4-methyl-3-aminobenzoic acid-2'-chloro-5'-trifluoromethylanilide, 4-chloro-3-aminobenzoic acid-2',5'-dichloranilide, 4-chlor-3-aminobenzoic acid-2'-chloro-5'-carbomethoxyanilide, 4-chlor-3-aminobenzoic acid-3'-chloranilide, 4-chlor-3-aminobenzoic acid-2'-chloro-5'-trifluoromethylanilide, 4-chlor-3-aminobenzoic acid-3'-trifluoromethylanilide, 4-chlor-3-aminobenzoic acid-3',5'-bis-trifluoromethylanilide, 4-chlor-3-aminobenzoic acid-2',4',5'-trichloranilide, 2,4-dichlor-5-aminobenzoic acid-2',5'-dichloranilide, 2,4-dichlor-5-aminobenzoic acid-2',4',-dichloranilide, 2,4-dichlor-5-aminobenzoic acid-3'-trifluoromethylanilide, 2,4-dichlor-5-aminobenzoic acid-3'-chloranilide, 5-amino-4-methoxy-2-chlorobenzoic acid-3'-trifluoromethylanilide, 4-methyl-3-aminobenzoic acid 2',5'-dichloranilide,4-methyl-3-amino-benzoic acid-3'-trifluoromethylanilide, 4-methoxy-3-aminobenzoic acid-3'-chloranilide, 4-methoxy-3-aminobenzoic acid-2',5'-dichloranilide, 4-methoxy-3-aminobenzoic acid-2',4',5'-trichloranilide, 4-carbomethoxy-3-aminobenzoic acid anilide, 4-methoxy-3-aminobenzoic acid-3'-trifluoromethylanilide, 4-carbethoxy-3-aminobenzoic acid-2',5'-dichloranilide, 4-methoxy-3-aminobenzoic acid-3',5'-bis-trifluoromethylanilide, 4-methoxy-3-aminobenzoic acid-2'-chloro-5'-trifluoromethylanilide, 4-methoxy-3-aminobenzoic acid-2',5'-dimethoxy-4'-chloranilide, 4-methoxy-3-aminobenzoic acid-2',5'4'-chloranilide, 4-aminobenzoic acid-2',4'-dichlorophenylamide, 4-aminobenzoic acid-2'-chloro-5'-trifluoromethylphenylamide, 4-amino-3-methylbenzoic acid-3'-trifluoromethylphenylamide, 4-amino3-methylbenzoic acid-4'-chlorophenylamide, and 4-amino-3-nitrobenzoic acid-2',5'-dichlorophenylamide.

The following may be mentioned as examples of aminobenzenes of formula (11a): 3-amino-4-methoxy-oxalic acid-dianilide, 3-amino-4-methoxy-2',5'-dichloro-oxalic acid-dianilide, 3-amino-4-methoxy-3'-trifluoromethyl-oxalic acid-dianilide, 3-amino-4-methyl-oxalic acid-dianilide, 3-amino-4-methyl-3'-chlor-oxalic acid-dianilide, 3-amino-4-chloroxalic acid-dianilide, 3-amino-4-methoxy-phenyloxamide acid ethyl ester, and 4-amino-2,5-dimethoxy-oxalic acid-dianilide.

The resulting azo dyestuff carboxylic acid is treated with a reagent which is capable of converting a carboxylic acid to its halide, for example chloride or bromide, for example, especially with a phosphorus halide, for example, phosphorus pentabromide or phosphorus pentachloride or phosphorus trichloride, a phosphorus oxyhalide and preferably with thionyl chloride.

The treatment with such acid-halogenating reagents is appropriately carried out in an inert organic solvent, for example, dimethylformamide, a chlorobenzene, for example monochlorobenzene or dichlorobenzene, toluene, xylene or nitrobenzene, and in the case of the five last-named solvents, optionally with the addition of dimethylformamide. In the manufacture of the carboxylic acid halides it is generally advantageous first to dry the azo compounds manufactured in an aqueous medium or to free them of water azeotropically by boiling in an organic solvent. This azeoptropic drying can, if desired, be carried out immediately prior to the treatment with the acid-halogenating agents.

The azo dyestuff carboxylic acid chloride obtained is condensed with amonoamine of formula $H_2N—R_3NH-COCONH—R_4$, especially those of formula (10) or (10a), or with a diamine of the formula $H_2N—R_3—NHCOCONH—R_3'—NH_2$.

The following amines may be mentioned as examples: 4-amino-oxalic acid-dianilide, 4-amino-4'-chlor-oxalic acid-dianilide, 4-amino-2'-chlor-oxalic acid-dianilide, 4-amino-3'-chlor-oxalic acid-dianilide, 4-amino-2',5'-dichlor-oxalic acid-dianilide, 4-amino-4'-methoxy-oxalic acid-dianilide, 4-amino-2'-methyl-5'-chlor-oxalic acid-dianilide, 4-amino-3-methyl-oxalic acid-dianilide, 4-amino-3-chlor-oxalic acid-dianilide, 4-amino-3-chloro-4'-chlor-oxalic acid-dianilide, 4-amino-2,5-dimethyl-oxalic acid-dianilide, 4-amino-2,5-dimethyl-4'-chlor-oxalic acid-dianilide, 4-amino-2,5-dimethyl-2',4'-dichlor-oxalic acid-dianilide, 4-amino-2,5-dichlor-oxalic acid-dianilide, 4-amino-2,5-dimethoxy-oxalic acid-dianilide, 4-amino-2-chloro-5-methoxy-oxalic acid-dianilide, N-(4-aminophenyl)-N'-α-naphthyl)-oxalic acid diamide, 4-aminophenylaminooxalic acid ethyl ester, N-(4-aminophenyl)-oxalic acid diamide, 4,4'-diamino-oxalic acid-dianilide, 4,4'-diamino-3-methyl-oxalic acid-dianilide, 4,4'-diamino-3,3'-dimethyloxalic acid-dianilide, 4,4'-diamino-2,2',5,5'-tetramethyloxalic acid-dianilide, 4,4'-diamino-2,2',5,5'-tetramethoxyoxalic acid-dianilide, 4,4'-diamino-2,2',5,5'-tetrachloroxalic acid-dianilide, 4,4'-diamino-2,5-dimethoxy-oxalic acid-dianilide, 4,4'-diamino-2,5-dimethyl-oxalic acid-dianilide, 4,4'-diamino-2-methoxy-5-chlor-oxalic acid-dianilide, 3,3'-diamino-,4,4'-dimethyl-oxalic acid-dianilide, 3,3'-diamino-oxalic acid-dianilide, 3,3'-diamino-4,4'-dimethoxy-oxalic acid-dianilide, 3,3'-diamino-4-methoxy-oxalic acid-dianilide and 3,3'-diamino-4-methyl-oxalic acid-dianilide.

These amines may be obtained according to known processes, for example, by condensation of a nitrophenylamino oxalic acid ester with an aniline derivative and the catalysed reduction of the resulting nitro compound.

The condensation of the carboxylic acid halide of the type initially mentioned and the amine is appropriately effected in an anhydrous medium. Under these conditions it generally takes place surprisingly easily even at temperatures which lie within the boiling range of normal organic solvents, for example, toluene, monochlorobenzene, dichlorobensene, trichlorobenzene and nitrobenzene. In order to accelerate the reaction it is generally advisable to use an acid-binding agent, for example, anhydrous sodium acetate or pyridine. The resulting dyestuffs are in part crystalline and in part amorphous and are in most cases obtained in very good yield and in a pure state. It is appropriate first to separate off the acid chlorides obtained from the carboxylic acids. In some cases a separation of the acid chlorides can however be dispensed with without doing harm and the condensation can take place immediately following the manufacture of the carboxylic acid chlorides.

According to embodiment (b) of the process according to the invention, the new dyestuffs are obtained if a diazotised aromatic amine, especially a diazotised aminobenzene of formula $H_2N—R_1$, is coupled with an azo component of formula $HR_2CONHR_3$.

Aminobenzenes of formulas (11) and (11a) may be especially mentioned as diazo compounds.

The coupling takes place by gradual addition of the aqueous-alkaline solution of the coupling component to the acid solution of the diazonium salt. The coupling is suitably effected at a pH-value of 4 to 6. The pH-value is advantageously adjusted by adding a buffer. Possible buffers are, for example the salts, especially alkali salts, of formic acid, phosphoric acid or especially acetic acid. The alkaline solution of the coupling component advantageously contains a wetting agent, dispersing agent or emulsifier, for example an aralkyl 1 sulfonate for example, dodecylbenzenesulphonate or the sodium salt of 1,1'-naphthylmethanesulphonic acid, polycondensation products of alkylene oxides, for example, the product of the action of ethylene oxide on p-tert-octylphenol, and furthermore alkyl esters of sulphoricinoleates, for example n-butyl-sulphoricinoleate. The dispersion of the coupling component can also advantageously contain protective colloids, for example, methylcellulose or minor amounts of inert organic solvents which are sparingly soluble or insoluble in water, for example optionally halogenated or nitrated aromatic hydrocarbons, for example, benzene, toluene, xylene, chlorobenzene, dichlorobenzenes or nitrobenzene, as well as aliphatic halogenated hydrocarbons, for example carbon tetrachloride or trichlor-ethylene and furthermore organic solvents which are miscible with water, for example, acetone, methyl ethyl ketone, methanol, ethanol or isopropanol.

The coupling can advantageously also be performed by continuously combining an acid solution of the diazonium salt with an alkaline solution of the coupling component in a mixing nozzle, whereupon coupling of the components takes place immediately. The resulting dyestuff dispersion is continuously withdrawn from the mixing nozzle and the dyestuff is separated off by filtration.

The aryldiazoamides to be used according to embodiment (b) of the process according to the invention are obtained according to a process known per se by reacting an aryldiazonium salt with a primary or preferably with a secondary amine compound. Many amines are suitable for this purpose, for example aliphatic amines, for example, methylamine, ethylamine, ethanolamine, propylamine, butylamine, hexylamine and especially dimethylamine, diethylamine, diethanolamine, methylethanolamine, dipropylamine or dibutylamine, amino-acetic acid, methylaminoacetic acid, butylamino-acetic acid, aminoethanesulphonic acid, methylamine-thanesulphonic acid, guanylethanesulphonic acid, β-aminoethylsulphuric acid, alicyclic amines, for example, cyclohexylamine, N-methylcyclohexylamine, and dicylohexylamine, aromatic amines, for example, 4-aminobenzoic acid, sulfanilic acid, 4-sulpho-2-amino-benzoic acid, (4-sulpho-phenyl)-guanidine, 4-N-methylaminobenzoic acid, 4-ethylaminobenzoic acid, 1-aminonaphthalene-4sulfonic acid, 1-aminonaphthalene-2,4-disulfonic acid, heterocyclic amines, for example, piperidine, norpholine, pyrrolidine or dihydroindole and finally also sodium cyanamide or dicyandiamide.

As a rule the diazoamino compounds obtained are sparingly soluble in cold water and can be separated off from the reaction medium in a crystalline form, after salting-out where appropriate. In many cases the moist press cakes can be used for the coupling. In some cases it can prove appropriate to dehydrate the diazoamides before the reaction by vacuum drying.

The coupling of the diazoamino compound with the coupling component takes place in an organic solvent, for example chlorobenzene, o-dichlorobenzene, nitrobenzene, pyridine, ethylene glycol, ethylene glycol monoethyl ether or monomethyl ether, dimethylformamide, formic acid or acetic acid. When using solvents which are miscible with water it is however not necessary to use the diazoamino compounds in the anhydrous form. The water-moist filter cakes may be example be used.

The coupling is suitably effected with warming, preferably at a temperature within the range of from 80° to 180° C., in an acid medium and generally takes place very rapidly and completely. If neutral solvents are used then the addition of an acid, for example hydrogen chloride, sulfuric acid, formic acid or acetic acid is advantageous. As a result of their insolubility the resulting pigments can be isolated from the reaction mixture by filtering them off. A post-treatment with an organic solvent, as is required in the case of pigments which are obtained by the aqueous coupling method, is therefore unnecessary in most cases.

The new dyestuffs are valuable pigments which are useful for a large number of pigment applications, for example in a finely divided form for the coloring of rayon and viscose or cellulose ethers and cellulose esters, or of super polyamides or super polyurethanes or polyesters in the spinning composition, as well as for the manufacture of colored lacquers or lacquer-forming agents, solutions or products of acetylcellulose, nitrocellulose, natural resins or synthetic resins, for example, polymerization resins or condensation resins, for example aminoplasts alkyd resins, phenoplasts, polyolefines such as polystyrene, polyvinyl chloride, polyethylene, polypropylene or polyacrylonitrile, rubber, casein, silicone and silicone resins. They can furthermore advantageously be used in the manufacture of crayons, printing inks, cosmetic preparations or laminated sheets.

Compared to the dyestuffs of U.S. Pat. 1,974,550, which contain a carbanilide groups instead of an oxanilide group, the dyestuffs according to the invention are distinguished by better fastness to migration.

The following Examples illustrate the invention;

In the Examples which follow the parts, unless otherwise specified, denote parts by weight and the percentages denote percentages by weight.

EXAMPLE 1

16.2 parts of diazotised 2,5-dichloraniline are coupled with 18.8 parts of 2,3-hydroxynaphthoic acid in the usual manner. The resulting azo dyestuff is dried and then converted to the azo dyestuff carboxylic acid chloride by means of thionyl chloride in o-dichlorobenzene.

7.6 parts of this monoazo dyestuff carboxylic acid chloride are stirred with 200 parts of o-dichlorobenzene and a hot solution of 5.5 parts of 4-amino-oxalic acid-dianilide in 150 parts of o-dichlorobenzene is added. The temperature of the mixture is 45° to 50° C. It is warmed to 140° C. during 1 to 1½ hours and stirred for 8 hours at 140° to 145° C. It is then allowed to cool to 100° C., filtered, and the product is washed with 500 parts of hot o-dichlorobenzene, then with 200 parts of cold methanol and finally with hot water and dried in vacuo at 70° to 80° C.

The resulting dyestuff of formula

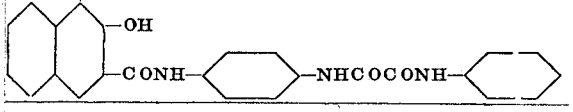

is a red finely crystalline powder which is sparingly soluble to insoluble in the usual organic solvents.

Plastics, for example, polyvinyl chloride and lacquers are colored in brilliant red shades having very good fastness to migration, overstripe bleeding and light.

The Table which follows describes further monoazo pigments which are obtained if, following the process described in paragraph 1, 1 mol of the diazo compound of the amines mentioned in column I is coupled to 1 mol of the 2,3-hydroxynaphthoic acid mentioned in column II, and the resulting monoazo dyestuff carboxylic acid is converted to the acid chloride and condensed with 1 mol of the amine mentioned in column III. Column IV describes the color shade of a polyvinyl chloride foil colored with the resulting pigment.

| | I | II | III | IV |
|---|---|---|---|---|
| 1 | 2,5-dichloraniline | 2,3-hydroxynaphthoic acid | 4-amino-4'-chloroxalic acid-dianilide | Red. |
| 2 | do | do | 4-amino-2',4'-dichlor-oxalic acid-dianilide | Red. |
| 3 | do | do | 4-amino-4'-methoxy-oxalic acid-dianilide | Red. |
| 4 | do | do | 4-amino-4'-methyloxalic acid-dianilide | Red. |
| 5 | do | do | 4-amino-2'-chloroxalic acid-dianilide | Red. |
| 6 | do | do | 4-amino-2,5-dichlor-oxalic acid-dianilide | Yellowish-tinged red. |
| 7 | do | do | 4-amino-2,5-dimethyl-oxalic acid-dianilide | Bluish-tinged red. |
| 8 | do | do | 4-amino-2,5-di-methyl-4'-chloroxalic acid-dianilide | Red. |
| 9 | do | do | 4-amino-2,5-dimethoxy-oxalic acid-dianilide | Bluish-tinged red. |
| 10 | do | do | 4-amino-3-methyloxalic acid-dianilide | Red. |
| 11 | 2,4,5-trichloraniline | do | do | Red. |
| 12 | do | do | 4-amino-oxalic acid-dianilide | Red. |
| 13 | do | do | 4-amino-2',5'-dichlor-oxalic acid-dianilide | Red. |
| 14 | do | do | 4-amino-2,5-dimethyl-oxalic acid-dianilide | Red. |
| 15 | do | do | 4-amino-3'-trifluoromethyloxalic acid-dianilide | Yellowish-tinged red. |
| 16 | 2-chloro-5-trifluoromethyl-aniline | do | 4-amino-oxalic acid-dianilide | Scarlet. |
| 17 | do | do | 4-amino-4'-chloroxalic acid-dianilide | Do. |
| 18 | do | do | 4-amino-2,5-dimethoxy-3'-chloroxalic acid-dianilide | Yellowish-tinged Red. |
| 19 | 4-trifluoromethyl-2-nitroaniline | do | 4-amino-oxalic acid-dianilide | Orange. |
| 20 | 2-methyl-5-chloraniline | do | do | Scarlet. |
| 21 | 2,4,6-trichloraniline | do | do | Red. |
| 22 | 2-chloraniline | do | do | Yellowish-tinged red. |
| 23 | 4-methoxyaniline | do | do | Yellowish tinged red. |
| 24 | 4-chlor-3-aminobenzoic acid methyl ester | do | do | Yellowish-tinged red. |
| 25 | do | do | 4-amino-4'-chloroxalic acid-dianilide | Yellowish-tinged red. |
| 26 | 4-methyl-3-aminobenzoic acid ethyl ester | do | do | Red. |
| 27 | do | do | 4-amino-oxalic acid-dianilide | Red. |
| 28 | do | do | 4-amino-2,5-dimethyl-oxalic acid-dianilide | Yellowish-tinged red. |

| I | II | III | IV |
|---|---|---|---|
| 29 | 4-methoxy-3-aminobenzoic acid methyl ester. | do | 4-amino-oxalic acid-dianilide | Bluish-tinged red. |
| 30 | 4-methyl-3-aminobenzoic acid phenyl ester. | do | do | Red. |
| 31 | 4-methoxy-2-nitroaniline | do | do | Red. |
| 32 | 4-methyl-3-aminobenzoic acid phenyl ester. | do | 4-amino-3'-trifluoromethyloxalic acid-dianilide | Yellowish-tinged scarlet. |
| 33 | do | do | N-(4-aminophenyl)-oxalic acid diamide | Scarlet. |
| 34 | 4-chlor-3-aminobenzoic acidanilide. | do | 4-amino-oxalic acid-dianilide | Red. |
| 35 | do | do | 4-amino-2,5-dimethyl-oxalic acid-dinailide | Red. |
| 36 | 4-chlor-3-aminobenzoic acid-2',5'-dichloranilide. | do | 4-amino-oxalic acid-dianilide | Red. |
| 37 | do | do | 4-amino-4'-carbomethoxyoxalic acid-dianilide | Yellowish-tinged red. |
| 38 | 4-chlor-3-aminobenzoic acid-3'-trifluoromethylanilide. | do | 4-amino-oxalic acid-dianilide | Scarlet. |
| 39 | do | do | N-(4-aminophenyl)-oxalic acid diamide | Do. |
| 40 | do | do | 4-amino-2,5-di-chlor-oxalic acid-dianilide | Red. |
| 41 | do | do | 4-amino-2,5-di-methyloxalic acid-dianilide | Red. |
| 42 | do | do | 4-amino-2,5-di-methoxyoxalic acid-dianilide | Red. |
| 43 | do | do | 4-amino-2,5-di-chloro-4'-methyloxalic acid-dianilide | Red. |
| 44 | 4-methyl-3-aminobenzoic acid-3'-trifluoromethylanilide. | do | 4-amino-2,5-di-methyloxalic acid-dianilide | Red. |
| 45 | do | do | 4-amino-2,5-di-chloroxalic acid-dianilide | Red. |
| 46 | do | do | 4-amino-2',5'-di-chloroxalic acid-dianilide | Red. |
| 47 | do | do | 4-amino-oxalic acid-dianilide | Red. |
| 48 | 5-amino-2,4-dichlorobenzoic acid-2',5'-dichloranilide. | do | do | Yellowish-tinged scarlet. |
| 49 | do | do | 4-amino-3'-trifluoromethyloxalic acid-dianilide | Do. |
| 50 | do | do | 4-amino-2,5-dimethyl-oxalic acid-dianilide | Scarlet. |
| 51 | do | do | N-(4-aminophenyl)oxalic acid diamide | Reddish-tinged orange. |
| 52 | 4-methoxy-3-aminobenzoic acid-3'-trifluoromethylanilide. | do | 4-amino-2,5-dimethyl-oxalic acid-dianilide | Bluish-tinged red. |
| 53 | do | do | 4-amino-oxalic acid-dianilide | Do. |
| 54 | 4-methoxy-3-aminobenzoic acid-2'-chloro-5'-trifluoromethylanilide. | do | do | Do. |
| 55 | 4-chlor-3-aminobenzoic acid-3'-carbomethoxyanilide. | do | do | Scarlet. |
| 56 | 2,5-dichloraniline | 6-bromo-2,3-hydroxynaphthoic acid. | do | Red. |
| 57 | do | 6-methoxy-2,3-hydroxynaphthoic acid. | do | Bluish-tinged red. |
| 58 | 4-chlor-3-aminobenzoic acid-3'-trifluoromethylanilide. | 6-bromo-2,3-hydroxynaphthoic acid. | do | Red. |
| 59 | do | 6-methoxy-2,3-hydroxynaphthoic acid. | do | Bluish-tinged red. |
| 60 | 4-methoxy-3-aminobenzoic acid-3'-trifluoromethyl anilide. | do | do | Ruby. |
| 61 | 5-chloro-2-methoxy-aniline | 2,3-hydroxynaphthoic acid | 4-amino-2,5-dimethyl-4'-methoxy-oxalic acid-dianilide | Bluish-tinged red. |
| 62 | 5-nitro-2-methoxy-aniline | do | do | Do. |
| 63 | do | do | 4-amino-2,5-di-methyl-oxalic acid-dianilide | Do. |
| 64 | do | do | 4-amino-oxalic acid-dianilide | Do. |
| 65 | 5-chloro-2-methoxy-aniline | do | 4-amino-4'-methoxy oxalic acid-dianilide | Do. |
| 66 | 4-nitro-2-methoxy-aniline | do | do | Ruby. |
| 67 | do | do | N-(4-amino-phenyl)-N'-α-naphthyl)-oxalic acid diamide | Do. |
| 68 | 5-chloro-2-methoxyaniline | do | do | Bluish-tinged red. |
| 69 | 4-methyl-3-aminobenzoic acid-2',5'-dichloroanilide. | do | 4-amino-4'-chloroxalic acid-dianilide | Red. |

EXAMPLE 2

7.7 parts of the dyestuff from 1 mol of diazotised 3-amino-4-chlorobenzoic acid and 1 mol of 2,5-di-methoxy-4-chlor-1-acetoacetylaminobenzene of formula

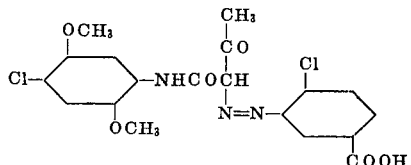

are stirred with 460 parts of o-dichlorobenzene and 0.5 part of dimethylformamide and warmed to 75°–90° C. 2.85 parts of thionyl chloride are allowed to run in at this temperature during 5 minutes and the mixture is stirred for a further 2 hours at 120° to 130° C. The end of the reaction is recognizable by the fact that the hydrochloric acid evolution ceases and that a sample shows uniformly yellow needles under the microscope. The mixture is allowed to cool to 30° C. and the product is filtered off and washed with 200 parts of benzene and then with 150 parts of petroleum ether. After drying at 50° to 60° C. in vacuo 7.1 parts of the dyestuff acid chlorides are obtained as a yellow crystalline powder. 4.8 parts of the acid chloride obtained above are stirred with 0.2 part of thionyl chloride in 100 parts of o-dichlorobenzene and warmed to 80°–85° C. A warm solution of 3.3 parts of 4-amino-2,5-dimethyl-4'-chlor-oxalic acid-dianilide in 350 parts of o-dichlorobenzene is then added and the mixture then warmed to 140°–145° C. for 12 hours. The resulting pigment is filtered off while hot, and washed with hot o-dichlorobenzene until the filtrate issues colorless. The dichlorobenzene is then displaced with cold methanol and the material finally thoroughly rinsed with hot water. After drying at 60° to 90° C. 7.1 parts of a soft powder are obtained; this is substantially insoluble in the usual solvents and on milling into polyvinyl chloride yields lively yellow shades having good fastness to migration and light. The pigment corresponds to the formula

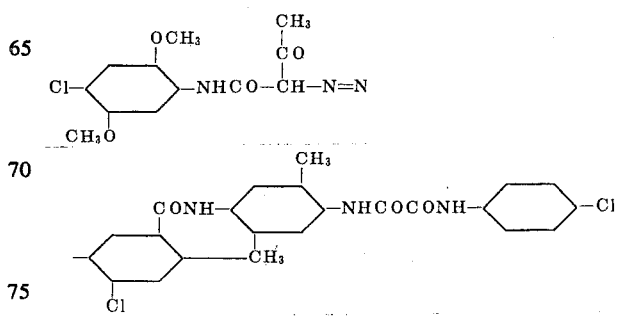

The Table which follows describes further monoazo pigments which are obtained if, following the process described in paragraph 1,1 mol of the diazo compound of the aminocarboxylic acid mentioned in column I is coupled with 1 mol of the acetoacetyl compound of the amine mentioned in column II, and the monoazo dyestuff carboxylic acid obtained is converted to the acid chloride and condensed with 1 mol of the amine mentioned in column III. Column IV describes the color shade of a polyvinyl chloride foil colored with the resulting pigment.

EXAMPLE 3

15.8 parts of the dyestuff from 1 mol of diazotised 2-chloro-5-trifluoromethylaniline and 1 mol of 2,3-hydroxy-naphthoic acid are stirred with 180 parts of benzene and 0.5 parts of dimethylformamide and warmed to 75° C. 6.7 parts of thionyl chloride are allowed to run in at this temperature during 5 minutes and the mixture is stirred for a further 2 hours at 75° C, whereupon the whole material dissolves. After the reaction mixture has cooled, the uniformly crystalline monocarboxylic acid chloride of the dyestuff is isolated by filtration and is washed with 150 parts of benzene and then with 200 parts of petroleum ether. After drying in vacuo at 50° C. 13.7 parts of the dyestuff acid chloride are obtained as a red crystalline powder. 4.2 parts of this chloride are stirred with 300 parts of o-dichlorobenzene and warmed to 80°–85° C. A hot solution as well as lacquers in excellent brown shades which are fast to light, migration and overstripe bleeding.

The pigment corresponds to the formula

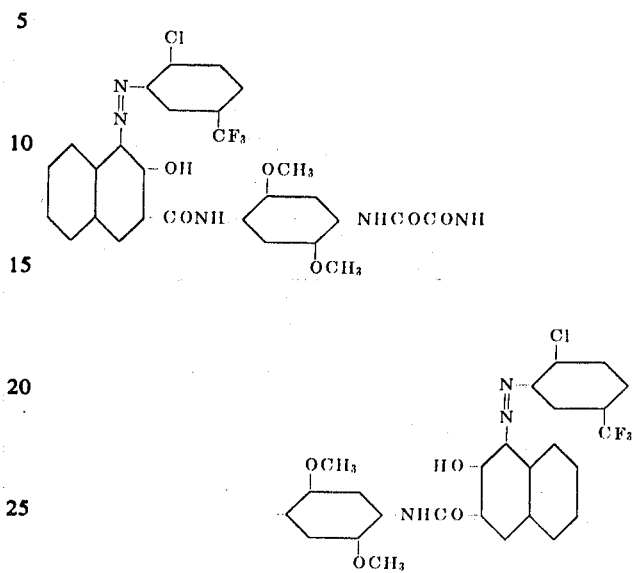

| I | II | III | IV |
|---|---|---|---|
| 69. 4-chlor-3-aminobenzoic acid | 2,5-dimethoxy-4-chloraniline | 4-amino-oxalic acid-dianilide | Yellow. |
| 70. do | do | 4-amino-4'-chloroxalic acid-dianilide | Do. |
| 71. do | do | 4-amino-3-methyl-2',5'-dichlor-oxalic acid-dianilide | Do. |
| 72. do | do | 4-amino-2,5-dichlor-oxalic acid-dianilide | Greenish-tinged yellow. |
| 73. do | do | 4-amino-2,5-dimethyl-3'-chloroxalic acid-dianilide | Reddish-tinged yellow. |
| 74. do | 2-methoxyaniline | do | Do. |
| 75. do | 2,5-dimethoxy-4-bromaniline | do | Do. |
| 76. 4-chlor-3-aminobenzoic acid | 2,5-dimethoxy-4-bromaniline | 4-amino-oxalic acid-dianilide | Yellow. |
| 77. do | 2-naphtylamine | 4-amino-2,5-dimethyl-oxalic acid-dianilide | Do. |
| 78. do | do | 4-amino-oxalic acid-dianilide | Do. |
| 79. 5-amino-2,4-dichlorobenzoic acid | do | do | Do. |
| 80. do | 2,5-dimethoxy-4-chloraniline | do | Do. |
| 81. do | do | 4-amino-2,5-dimethoxy-4'-chloroxalic acid dianilide | Reddish-tinged yellow. |
| 82. 4-methyl-3-aminobenzoic acid | 2,5-dimethoxy-4-chloraniline | 4-amino-2,5-dimethoxy-4'-chlor-oxalic acid-dianilide | Do. | of 1.95 g. of 4,4'-diamino-2,2',5,5'-tetramethoxyoxalic-dianilide in 50 parts of o-dichlorobenzene is then added and the mixture warmed to 140°–145° C. for 12 hours. Thereafter the finely crystalline sparingly soluble pigment is filtered off while hot and washed with hot o-dichlorobenzene until the filtrate issues colorless, and is then washed with cold methanol and finally with hot water. After drying at 80° to 85° C. in vacuo 4.4 parts of a soft powder are obtained; this is substantially insoluble in the usual solvents and colors polyvinyl chloride foil The Table which follows describes further disazo pigments which are obtained if, following the process described in paragraph 1, 2 mols of the diazo compound of the amines mentioned in column I are coupled with the 2,3-hydroxynaphthoic acids mentioned in column II, and the resulting monoazo dyestuff carbosylic acid is converted to the acid chloride and condensed with 1 mol of the diamine mentioned in column III. Column IV describes the color shade of a polyvinyl chloride foil colored with the pigment obtained.

| I | II | III | IV |
|---|---|---|---|
| 83. 2,5-dichloraniline | 2,3-hydroxy-naphthoic acid | 4,4'-dimethyl-3,3'-diamino-oxalic acid-dianilide | Red. |
| 84. do | do | 4,4'-dimethoxy-3,3'-diamino-oxalic acid-dianilide | Brown. |
| 85. do | do | 4,4'-diamino-2,2',5,5'-tetramethyl-oxalic acid-dianilide | Red. |
| 86. do | do | 4,4'-diamino-2,5-diethoxy-oxalic acid dianilide | Reddish brown. |
| 87. do | do | 4,4'-diamino-3-methyl-oxalic acid-dianilide | Red. |
| 88. do | 6-bromo-2,3-hydroxy-naphthoic acid | 4,4'-diamino-2,2',5,5'-tetraethoxy-oxalic acid-dianilide | Brown. |
| 89. 2-chloro-5-trifluoro-methylaniline | 2,3-hydroxy-naphthoic acid | do | Do. |
| 90. do | do | 4,4'-dimethyl-3,3'-diamino-oxalic acid-dianilide | Red. |
| 91. do | do | 4,4'-diamino-oxalic acid-dianilide | Orange. |
| 92. do | do | 4,4'-diamino-2,5-dimethoxy-oxalic acid-dianilide | Brown. |
| 93. 2,4,5-trichloraniline | do | do | Do. |
| 94. do | do | 4,4'-diamino-2,2',5,5'-tetramethoxy-oxalic acid-dianilide | Do. |
| 95. do | do | 4,4'-diamino-2,2',5,5'-tetramethyloxalic acid-dianilide | Reddish-brown. |
| 96. 4-trifluoro-methyl-2-nitroaniline | do | do | Do. |
| 97. do | do | 4,4'-diamino-2,2',5,5'-tetramethoxy-oxalic acid-dianilide | Yellowish brown. |
| 98. do | do | 4,4'-diamino-2,2',5,5'-tetrachloroxalic acid-dianilide | Scarlet. |
| 99. 5-chloro-2-methylaniline | do | 4,4'-diamino-oxalic acid-dianilide | Red. |
| 100. Anthranilic acid methyl ester | do | do | Brown. |
| 101. do | do | 4,4'-diamino-2,2',5,5'-tetramethyl-oxalic acid-dianilide | Brownish-tinged red. |
| 102. 4-Chlor-3-aminobenzoic acid methyl ester | do | 4,4'-diamino-2,2',5,5'-tetramethoxy-oxalic acid-dianilide | Brownish-red. |

EXAMPLE 4

4.3 parts of 4-m thoxy-3-amino-oxalic acid-dianilide are diazotised in the usual manner using glacial acetic acid and aqueous hydrochloric acid, ice and sodium nitrite. On the other hand, 6.3 parts of 4-(2'-hydroxy-3'-naphthoyl-amino)-2,5-dimethyl-1-benzoylaminobenzene are dissolved in a mixture of 100 parts of ethanol, 100 parts of water and 6 parts of 30 percent strength sodium hydroxide solution in the cold. 1 part of the condensation product of 8 mols of ethylene oxide and 1 mol of p-tert.-octylphenol is added to the solution and the naphthol subsequently precipitated with 30 percent strength acetic acid with good stirring at a pH-value of 6.0 to 6.5. Coupling is effected by adding the diazo solution described above while maintaining a pH-value of subsequently to 6.5 and a temperature of 20° to 30° C. by adding soda solution. In order to complete the coupling the mixture is further stirred for 1 hour at the same temperature and the resulting pigment suspension is rendered acid to Congo Red by adding hydrochloric acid and filtered. The product is washed with hot water until no further chloride ions are detectable in the filtrate. After drying at 80° to 90° C. in vacuo, 8.5 parts of the red pigment dyestuff of formula

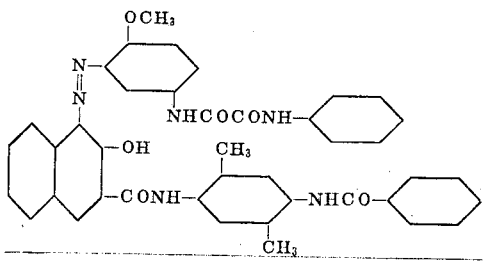

are obtained. This is sparingly soluble to insoluble in the usual solvents and colors polyvinyl chloride foil and lacquers in bluish-red shades having good fastness to migration, overstripe bleeding and light.

The table which follows describes further monoazo pigments which are obtained if, following the fourth process described, 1 mol of the diazo compound (or 2 mols for bisacetoacetyl compounds) of the amines mentioned in column I are coupled with 1 mol of the coupling components of the 2,3-hydroxynaphthoic acid- or acetoacetyl-arylidenes mentioned in column II. Column III describes the color shade of a polyvinyl chloride foil colored with the resulting pigment.

(manufactured by reacting diazotised 4-methoxy-3-amino-oxalic acid-dianilide with piperidine in an alkaline medium) and 3.6 parts of 4(-2'-hydroxy-3'-naphthoylamino)-5-chloro-2-methoxy-1-benzoylaminobenzene are suspended in 250 parts of o-dichlorobenzene, warmed to 70°–75° C. and mixed with 20 parts of glacial acetic acid. The mixture is now stirred for a further 2 hours at 120° to 130° C., whereby the decomposition of the diazoamino compound and the coupling to give the pigment is completed. The red pigment is filtered off while hot, and rinsed with hot o-dichlorobenzene, cold methanol and hot water. After drying in vacuo at 80° C. a bluish-tinged red monoazo dyestuff of formula

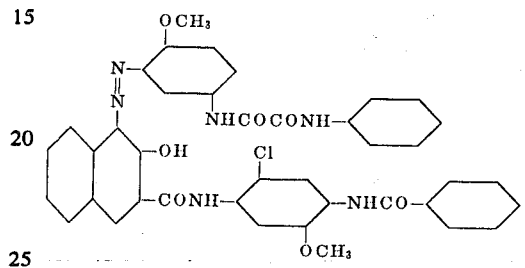

is obtained in a good yield. The pigment is sparingly soluble to insoluble in the usual solvents and colors polyvinyl chloride in red shades which are fast to light, overstripe bleeding and migration.

EXAMPLE 6

1.9 parts of 3,3'-diamino-4,4'-dimethyl-oxalic acid-dianilide are tetrazotised in the usual manner by means of glacial acetic acid and aqueous hydrochloric acid, ice and sodium nitrite.

On the other hand 3.5 parts of 2,5-dimethoxy-4-chlor-1-acetoacetylaminobenzene are dissolved in a mixture of 300 parts of water and 6.5 parts of 30 percent strength sodium hydroxide solution. 1 part of the condensation product of 8 mols of ethylene oxide and 1 mol of p-tert.-octylphenol is added to the solution and the naphthol is subsequently precipitated with 30 percent strength acetic acid at a pH-value of 6.0 to 6.5 and with good stirring. Coupling is effected by adding the diazo solution described above, while maintaining a

| | I | II | III |
|---|---|---|---|
| 103 | 4-methoxy-3-amino-oxalic acid-dianilide | 4-(2'-hydroxy-3'-naphthoylamino)-1-benzoyl-aminobenzene. | Red. |
| 104 | ....do.... | 4-(2'-hydroxy-3'-naphthoylamino)-2,5-dimethoxy-1-(4"-chloro)-benzoylaminobenzene. | Bluish-tinged red. |
| 105 | ....do.... | 2-hydroxy-3-naphthoic acid anilide | Red. |
| 106 | ....do.... | 2-hydroxy-3-naphthoic acid-β-napthylamide | Bluish-tinged red. |
| 107 | ....do.... | 2-hydroxy-3-naphthoic acid-2',4'-dimethoxy-5'-chloranilide. | Do. |
| 108 | 4-methoxy-3-amino-2',5'-dichlor-oxalic acid-dianilide. | ....do.... | Do. |
| 109 | 4-methoxy-3-amino-3'-trifluoromethyl-oxalic acid-dianilide. | 2-hydroxy-3-naphthoic acid-α-naphthylamide | Do. |
| 110 | 4-methyl-3-amino-oxalic acid-dianilide | ....do.... | Red. |
| 111 | 4-methoxy-3-amino-oxalic acid-dianilide | 4-(2'-hydroxy-3'-naphthoylamino)-1-benzoyl-aminobenzene. | Red. |
| 112 | 4-methyl-3-amino-2',5'-dichlor-oxalic acid-dianilide. | ....do.... | Red. |
| 113 | 4-chlor-3-amino-oxalic acid-dianilide | ....do.... | Scarlet. |
| 114 | ....do.... | 2-hydroxy-3-naphthoic acid-anilide | Red. |
| 115 | 5-amino-2,4-dichloro-2',5'-dichlor-oxalic acid-dianilide. | ....do.... | Red. |
| 116 | N-(4-methoxy-3-aminophenyl)-oxalic acid-diamide. | ....do.... | Bluish-tinged red. |

EXAMPLE 5

3.6 parts of diazoamino compound of formula

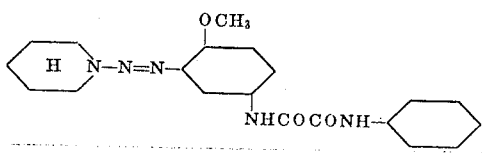

pH-value of 6 to 6.5 and a temperature of 20° to 30° C. by adding soda solution. In order to complete the coupling the mixture is stirred for a further hour at the same temperature and then another hour at 70° to 80° C., and the resulting pigment suspension is rendered acid to Congo Red by adding hydrochloric acid and is filtered off. The product is washed with hot water until no further chloride ions are detectable in the filtrate. After drying at 80° C. in vacuo 5.0 parts of the yellow pigment dyestuff of formula

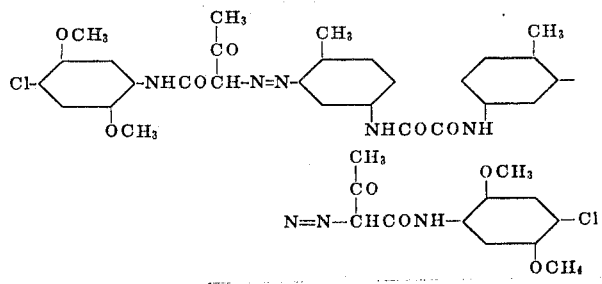

are obtained. This sparingly soluble to insoluble in the usual solvents and colors polyvinyl chloride foil and lacquers in yellow shades of good fastness to migration, overstripe bleeding and light.

EXAMPLE 7

65 parts of stabilized polyvinyl chloride, 35 parts of dioctyl phthalate and 0.2 parts of the dyestuff obtained according to example 1 are stirred together and milled to and fro for 7 minutes at 140° C. on a two-roll calender. A foil colored a pure orange shade and having very good fastness to light and migration is obtained.

I claim:
1. A disazo pigment of the formula

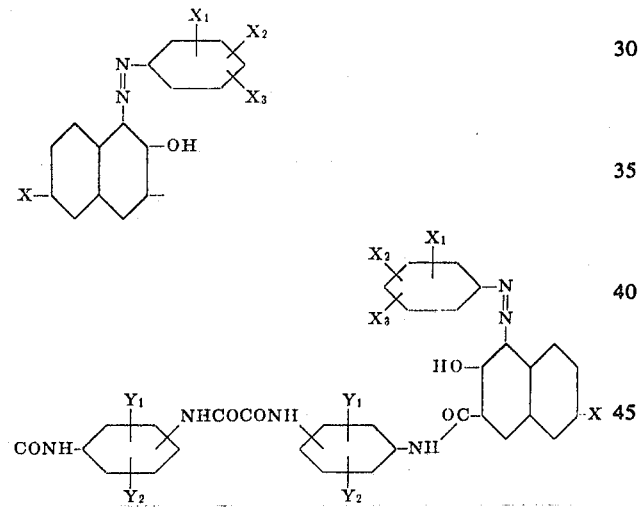

in which [X, $X_1$, $X_2$, $X_3$, $Y_1$ and $Y_2$ have the meanings given in claim 2].

In which X represents hydrogen, halogen or lower alkoxy, $X_1$ represents hydrogen, halogen, lower alkyl, lower alkoxy, phenoxy, nitro, cyano, lower carbalkoxy, carbophenoxy, lower alkanoylamino or trifluoromethyl, $X_2$ stands for hydrogen, halogen, lower alkyl, lower alkoxy or trifluoromethyl, $X_3$ represents hydrogen, halogen or a group of formula —$CONHR_5$, in which $R_5$ represents hydrogen, lower alkyl or phenyl radical which may be substituted by halogen, lower alkyl, alkoxy, or carbalkoxy, nitro or trifluoromethyl, $Y_1$ and $Y_2$ each represents hydrogen, halogen or lower alkyl or alkoxy.

2. The compound of the formula

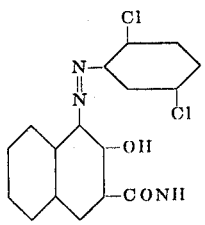

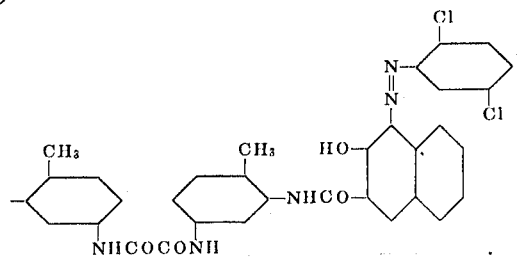

* * * * *